United States Patent [19]  [11] Patent Number: 4,587,148
Campbell et al.  [45] Date of Patent: May 6, 1986

[54] FLOCKED FLOOR MAT WITH FORAMINOUS LAYER

[75] Inventors: Douglas D. Campbell, Minneapolis; Mary B. Donovan, St. Paul, both of Minn.

[73] Assignee: Minnesota Mining and Manufacturing Company, St. Paul, Minn.

[21] Appl. No.: 725,238

[22] Filed: Apr. 19, 1985

[51] Int. Cl.$^4$ .............................................. B32B 3/06
[52] U.S. Cl. ...................................... 428/88; 428/90; 428/95; 428/116; 428/186
[58] Field of Search ................... 428/88, 90, 95, 116, 428/186

[56] References Cited

U.S. PATENT DOCUMENTS

| | | | |
|---|---|---|---|
| 3,518,154 | 6/1970 | Broadhurst | 161/64 |
| 3,674,611 | 7/1972 | Petry et al. | 161/63 |
| 3,837,988 | 9/1974 | Hennen et al. | 161/67 |
| 3,943,018 | 3/1976 | Petry et al. | 156/79 |
| 4,293,604 | 10/1981 | Campbell | 428/90 |
| 4,381,324 | 4/1983 | Ellingson, Jr. | 428/58 |
| 4,421,809 | 12/1983 | Bish et al. | 428/90 |

Primary Examiner—Marion C. McCamish
Attorney, Agent, or Firm—Donald M. Sell; James A. Smith; David L. Weinstein

[57] ABSTRACT

Article suitable for floor mats comprising a backing, a foraminous element bonded thereto, said element characterized by having a multiplicity of openings therein, and bristles bonded to the backing, said bristles having a length such that they will protrude through said openings when the mat is trod upon by pedestrians, thereby allowing contact between the bristles and the shoes on feet of the pedestrians. The mat is useful in removing soil and moisture from the shoes and feet of pedestrians.

14 Claims, 5 Drawing Figures

FLOCKED FLOOR MAT WITH FORAMINOUS LAYER

BACKGROUND OF THE INVENTION

This invention relates to composite mats.

Mats of various types have been used to remove soil and moisture from the shoes and feet of pedestrians by providing a brushing or wiping action against the shoes or feet. These mats are generally of two types. One type has a fibrous surface and the other type has a plastic or metallic surface characterized by openings therethrough. Examples of fibrous mats are described in U.S. Pat. Nos. 3,837,988 and 4,293,604. Examples of plastic mats having openings therethrough are described in assignee's copending application U.S. Ser. No. 550,641, filed Nov. 10, 1983.

Fibrous mats having loosely packed, coarse fibers effectively remove and retain soil from shoes, but do not remove moisture effectively when they become saturated. Addition of short flock to the fibers of such a mat, as described in U.S. Pat. No. 4,293,604, enhances moisture removal but tends to render these mats somewhat more difficult to clean and causes them to show premature wear. Fibrous mats having densely packed, fine fibers, i.e., the so-called carpet-type mats, generally are effective for moisture removal, but solid soil accumulating on the surface thereof produces an undesirable appearance. Plastic mats having openings therethrough generally are not quite as effective in removing soil from shoes as are fibrous mats. Accordingly, it is desirable to produce a floor mat which is effective for both soil removal and moisture removal.

SUMMARY OF THE INVENTION

This invention involves an improved mat for removal of soil and moisture from the shoes and feet of pedestrians.

The mat comprises a backing, a foraminous element bonded to said backing, said element having a multiplicity of openings therein, and a multiplicity of bristles having one end bonded to said backing. The bristles are capable of protruding through the openings in the foraminous element to contact the feet or shoes of pedestrians when the element is trod upon by them.

It is preferred that drainage channels be provided in the foraminous element so that moisture descending from the upper surface of the element to the lower surface of the element will have an outlet to minimize the tendency of the mat to become waterlogged.

The mat provides several advantages over conventional floor mats. Because the foraminous element prevents the bristles from being crushed down to the surface of the backing when the mat is tread upon, the mat is more durable than conventional fibrous mats and the soil removal capability of the bristles is enhanced. When drainage channels are incorporated into the foraminous element, removal of moisture from shoes and feet of pedestrians is improved. The presence of bristles also enhances the appearance of the foraminous element. The mat has good durability, good appearance, and excellent soil and moisture removal ability.

BRIEF DESCRIPTION OF DRAWINGS

For convenience in understanding the invention, attention is directed to the accompanying drawings, in which.

DETAILED DESCRIPTION

Figure 1:
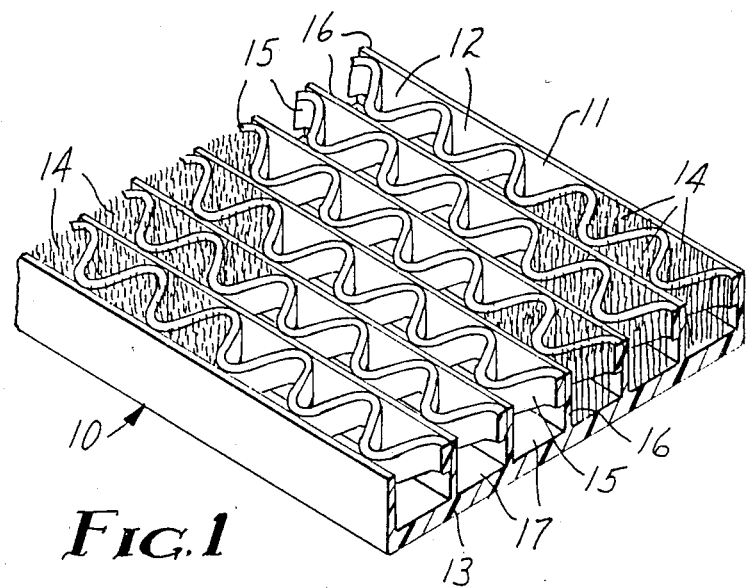
FIG. 1 is a greatly enlarged perspective view of a mat of the invention.

The mat 10 of this invention comprises a foraminous element 11 having a multiplicity of openings 12 formed therein, a backing 13, and bristles 14.

The foraminous element 11 is a three-dimensional layer typically in the form of a sheet or slab and having a multiplicity of openings 12 extending through the entire thickness thereof. As used herein, the thickness of the foraminous element means the straight-line distance between the upper surface of the backing and the upper surface of the foraminous element.

The functions of the foraminous element 11 are to cushion the feet of pedestrians and to act as a barrier between the backing and the ends of the bristles not bonded to the backing so that the bristles are not crushed all the way down to the surface of the backing when the mat is trod upon. The barrier function thus helps to prolong the life of the mat. In addition to the readily apparent function of providing space for the bristles to protrude, the openings in the element 11 also allow moisture to travel downwardly along the bristles so that the upper surface of the element 11 will not be saturated with moisture.

The foraminous element 11 should be formed of material that is water-resistant, wear-resistant, and structurally stable. Preferably, the material should also be flexible, resilient, and conformable to surfaces upon which it is placed. One class of materials possessing the foregoing characteristics is organic polymers. The preferred organic polymeric materials for forming the three-dimensional layer include polyvinyl chlorides, polyesters, e.g. polyethylene terephthalate, and polyurethanes. The most preferred material is polyvinyl chloride. various rubber materials can also be used.

The foraminous element 11 can be formed from cast sheet material having openings 12 formed through the thickness thereof. The openings 12 can be provided by means of the mold from which the cast sheet is formed, or they can be provided by cutting out sheet material by means of a die. The element 11 is preferably formed from ribbon-like strips 15 which are undulated and connected on their major surfaces to like undulated strips or to straight, elongated strips 16. FIG. 1 shows openings 12 bounded by undulated strips 15 and straight, elongated strips 16. The area of the upper surface of the foraminous element 11 preferably comprises at least 40% openings and less than 60% solid material, so that a sufficient number of bristles can protrude through the element 11 so as to be available for contact with shoes and feet. However, the element 11 must have sufficient solid material of sufficient strength and in appropriate structural configuration to avoid being permanently deformed by the force applied by persons standing thereon. Accordingly, the element 11 should be able to withstand a force of a large person, e.g. at least about 250 lbs. The openings 12 must be of such dimensions and configuration that the bristles will extend therethrough to contact feet and shoes when the mat is trod upon.

The foraminous element 11 is preferably at least about 5 mm thick, more preferably 10 to 25 mm thick and the openings 12 are at least about 2 mm, preferably about 3 to 20 mm in average diameter or average width. The shape of the openings 12 can vary. For example, they can be circular, elliptical, polygonal, or irregular. As shown in FIG. 1, the openings 12 in the element 11 are the shape of bell-shaped curves.

The backing 13 provides support and anchorage for the foraminous element and the bristles, and provides the major surface which contacts the floor. The backing also helps the mat lie flat and not move when subjected to pedestrian traffic. Like the material of the foraminous element, the material of backing 13 should be water-resistant, wear-resistant, and structurally stable and preferably flexible and conformable to surfaces upon which it is placed. The backing 13 is preferably formed from an organic polymeric material. It is preferred that the backing 13 be prepared in situ at the same time that a preformed foraminous element and the bristles are bonded thereto. When the backing 13 is prepared in situ, the viscosity of the curable liquid-state polymeric material from which it is formed should be such as to permit penetration by and wetting of the bristles to insure firm bonding thereof. The backing 13 is preferably formed from a filled polyvinyl chloride plastisol into which the preformed foraminous element and bristles are placed. It is also preferred that the backing 13 be a continuous sheet material because a discontinuous material would allow soil and moisture to accumulate under the mat, which could possibly lead, over time, to deterioration of the covered area. The continuous material may be solid, an open cell foam, a closed cell foam, or combination thereof. The thickness of the backing 13 can vary. A typical thickness range is from about 1 to about 5 mm.

The functions of the bristles 14 are to aid in removing soil and moisture from the shoes of pedestrians and to enhance the appearance of the foraminous element.

The bristles 14 are preferably straight fibers and they can have a length less than, equal to, or greater than the thickness of the foraminous element 11. The bristles must be of such a length that they will protrude through the openings 12 of element 11 to contact feet and shoes when the mat is trod upon. The bristles are generally substantially erect when they are contacting feet and shoes so that they can effectively remove moisture and soil therefrom. If the bristles have a length greater than the thickness of layer 11, it is preferred that they extend no more than about 10 mm beyond the upper surface of the foraminous element 11. Extension of a greater distance will probably result in reduced durability of the bristles. Bristles having a length less than the thickness of element 11 are less likely to be pulled out of the backing by foot motion of pedestrians. However, bristles having a length greater than the thickness of element 11 provide better soil and moisture removal capabilities and improve the appearance of the mat. Accordingly, bristles having a length approximately equal to the thickness of element 11 may be preferred because they provide good soil and moisture removal capability and little likelihood of being pulled out of the the backing under normal conditions of use The bristles are made from water-resistant and wear-resistant material, preferably nylon, polyester, acrylic, rayon, or polypropylene fiber. The diameter of the bristles 14 can vary, and preferably correspond to from about 6 to about 350 denier. When the bristles 14 are formed from individual fibers, the preferred bristle diameter range corresponds to from about 40 to about 350 denier. The bristles 14 can also be formed from slasher flock, which is a plurality of fibers, e.g., 100 to 200 ends, that are bonded together with a soluble binder which is removed after the fibers are bonded to the backing. When the bristles 14 are formed from slasher flock, the preferred bristle diameter range corresponds to from about 5 to about 50 denier.

It is very much preferred that a plurality of channels 17 for drainage of moisture be located adjacent the lower surface of the foraminous element 11. Although such channels are not required, the inclusion thereof allows moisture to drain away from the sides of the mat. In the absence of drainage channels 17, moisture can be removed manually by turning the mat 10 over so that the moisture can be removed by gravity or by evaporation.

Figure 2:
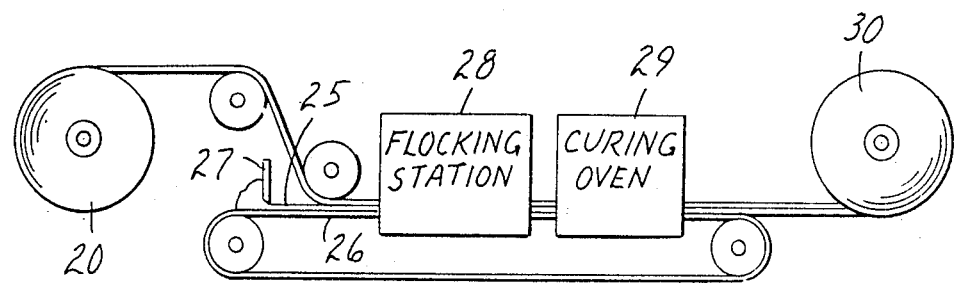
FIG. 2 represents a schematic view of a process for producing the mat of the present invention.

The mat 10 of the invention can be produced by following the process which is schematically depicted in FIG. 2. Foraminous element 11 is drawn from a storage roll 20 and then laid into a layer 25 of curable polymer in the liquid state which has been coated onto carrier belt 26 by knife coater 27. When cured, the polymeric material of layer 25 will form the backing 13. At flock coating station 28 the element 11 is coated with bristles 14, which are then caused to penetrate into the openings 12 of element 11 and further penetrate into the liquid material of layer 25.

The bristles 14 may be applied using conventional flock coaters which use mechanical motion to disperse and cause the bristles 14 to pass through the openings 12 of the element 11. The devices are commercially available and a representative example thereof is an "Indev" 650 mm wide flock machine. Excess bristles 14 deposited at coating station 25 may be removed by vacuuming.

After the composite mat material leaves the flock coating station, the polymeric material of layer 25 is cured to form backing 13 and to simultaneously bond the thus-formed backing 13 to the foraminous element 11 and bristles 14. Preferably, the curing step is conducted in an oven 29 under conditions conventionally employed to cure the polymeric material of layer 25.

If the bristles 14 used in the invention are slasher flock, it is desirable to lightly wash the bristle surface of the cured composite mat with water or other agents to remove the temporary binder which holds the filaments of the slasher flock together.

The resultant composite mat can be rolled to provide a bulk roll 30 for future conversion to smaller sizes. Alternatively, the composite mat can be cut into shorter segments for immediate use instead of being formed into a roll.

A method of making the preferred embodiment of the foraminous element 11 is given in assignee's copending patent application U.S Ser. No. 550,641, filed Nov. 10, 1983, and incorporated herein by reference.

Figure 3:
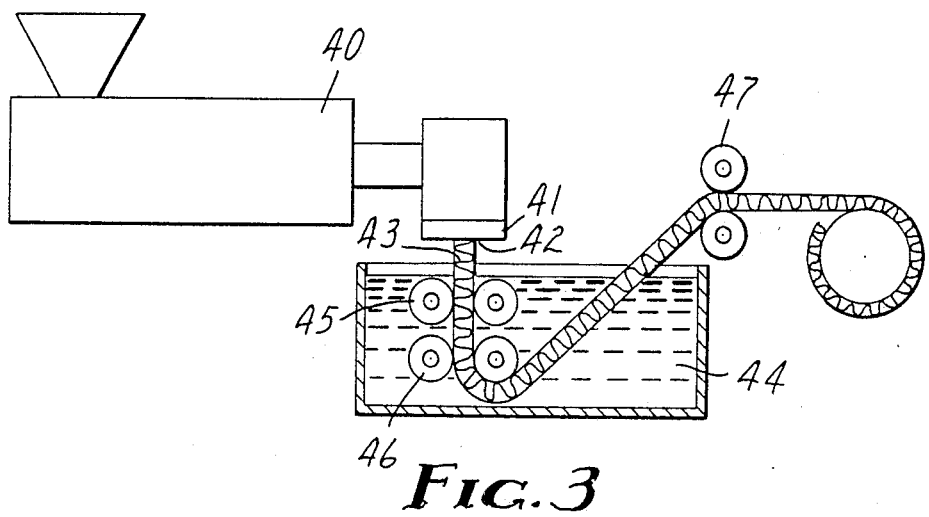
FIG. 3 represents a schematic view of a process for producing the foraminous element of the mat of the present invention.

As shown in FIG. 3 a filament forming, extrudable plastic mass is extruded by extruder 40 (where the extruded substance may be rendered plastic) from extruder die 41 which has the appropriate extruder orifices 42 to form substantially continuous extruded web 43. As shown in FIG. 3 the extruded web may be fed into quench bath 44 containing a suitable quenching medium such as water and guided therein by idler roll sets 45 and 46 and removed therefrom by passing between idler roll set 47 after which it can be wound for storage or incorporated directly into a product.

Figure 4:
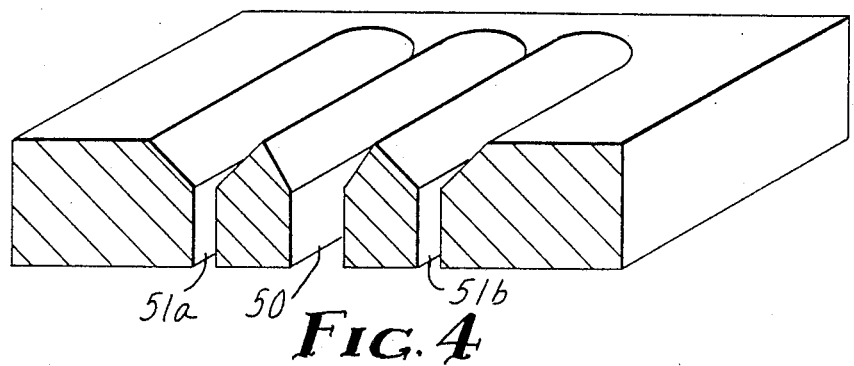
FIG. 4 is an enlarged view of a die used to make the foraminous element of the mat of the present invention.

FIG. 4 depicts a typical extruder die, having three slot-like openings and being tapered on the inlet side around each opening. A central opening 50 is a wider slot than outer openings 51a and 51b. Wider center opening 50 is spaced within narrower openings 51a and 51b to produce a velocity of flow of the filament-forming extrudable plastic mass so that the ribbon-like strip extruded from center opening 50 flows faster than the straight, elongated strip extruded through openings 51a and 51b. Appropriate spacing of openings, contact between the central extruded strip emitting from opening 50 and an adjacent strip (e.g., the strip extruded from opening 51a) and then the strip extruded from the other adjacent opening produces a regular folded structure. The faster moving center strip extruded from the opening 50 tends to fold back and forth or oscillate between slower moving strips extruded from openings 51a and 51b.

The faster moving center strip at some point after exiting the die will attach itself to one of the outer strips. The attachment by necessity retards the flow of the center strip and causes a buckling or bunching of the central strip, causing it to bend toward the other slower moving outer strip. This motion repeats itself in a regular oscillatory fashion. The difference in velocity between the extruded strips results in the central strip bending back and forward in a regular manner and frequency. In the case of typical thermoplastic materials, a contact bond is formed when the two tacky surfaces touch each other sequentially during the process, and, by quenching the tacky material in an appropriate manner, the thermoplastic material is frozen in this zig-zag structure.

Preferably, outer openings 51a and 51b are of greater length than central opening 50 so that the strips emerging from outer openings 51a and 51b will be wider than the strip emerging from the central opening 50. Alternatively, outer openings 51a and 51b can be of lesser length than central opening 50 so that strips emerging from openings 51a and 51b will be narrower than the strip emerging from opening 50. The resulting difference in width between connected strips defines the vertical length of the drainage channels 17 of the composite mat. The drainage channels 17 can be beneath either the undulated strips or the straight strips.

Typical aspect ratio values, i.e., length to width of the extruded strip, for articles produced according to the decribed method fall in the range of about 2:1 to 12:1.

Figure 5:
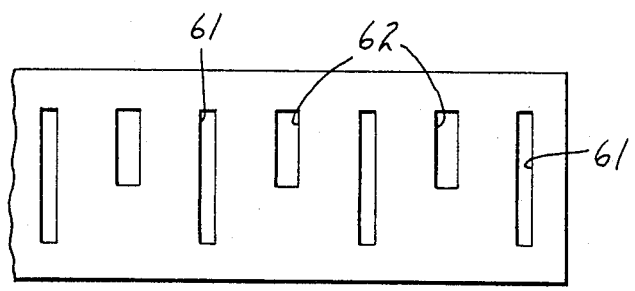
FIG. 5 is a plan view of a die used to make the foraminous element of a particular embodiment of the mat of this invention.

It is possible to interconnect a series of such strips by employing, for example, a die of the type depicted in FIG. 5 to produce a layer of the type depicted in FIG. 1. The die, of course, would have appropriate openings 61, 62 sufficient in number to produce an element 11 of desired surface dimensions.

Various modifications of extruded structures depend substantially upon the extrusion slot dimensions and the means by which differential flow is achieved. The process requires that the undulatable strip be extruded faster than the straight strips. This may be accomplished, for example, by modification of the dimensions of the extrusion orifices, the extrusion die (for example, by variation of the path length within the die) or by employing a multi manifold die with independent flow control for the undulatable strip and for the straight strip. The first method, that utilizing different orifice sizes to achieve differential flow, is the simplest and preferred method. Optionally, the layer made according to the teaching of U.S. Ser. No. 550,641 may be lightly coated with a binder to provide reinforcement therefor.

Bristles and material for forming the backing are commercially available.

The following non-limiting examples will further illustrate the invention. All percentages are percent by weight unless otherwise indicated.

EXAMPLE 1

A foraminous element was prepared by extruding a plasticized polyvinyl chloride containing 57.1% of a medium molecular weight vinyl chloride polymer and 42.9% monomeric phthalate plasticizer together with small amounts of stabilizers and other modifiers through a die similar to that shown in FIG. 5. The mixture was extruded at a pressure of about $6.9 \times 10^6$ Pa through a die having the following dimensions:

| | |
|---|---|
| Slot width (major) | 0.76 mm |
| Slot length (major) | 2.03 mm |
| Slot width (minor) | 0.56 mm |
| Slot length (minor) | 6.30 mm |
| Slot spacing | 3.05 mm |
| Number of major slots | 29 |
| Number of minor slots | 30 |

Slot position of major slot offset 0.25 mm in from edge of minor slot

The die was heated to about 175° C. and positioned about 10 mm above the surface of a 660 mm wide, 915 mm long, 355 mm deep water quench bath which was being flushed with 15° C. to 20° C. water at the rate of $7.5 \times 10^{-5} m^3$/sec. Two horizontally opposed rolls 125 mm in diameter and 560 mm long having a gap to permit the extruded element to pass through without compression guided the element in the quench bath. A second set of horizontally opposed rolls, 65 mm in diameter, positioned 152 mm on centers immediately below the first set of rolls guided the quenched element out of the bath. The formed element was then dried in preparation for the next step. The extruded element weighed 2.2 kg/m² and was 6.4 mm thick. The element was then coated on its upper major surface with a liquid polyvinyl chloride plastisol using a two-roll coater having a metered amount of the liquid plastisol applied from a doctor blade to the top roll. The liquid plastisol was composed of 54.5% dispersion grade polyvinyl chloride resin, 40.9% mixed dialkyl phthalate plasticizer, together with small amounts of stabilizers and other additives. After the element had been coated, compressed air was blown onto it to insure that the plastisol coating would not block the openings which run through the layer. Plastisol coating weight was 0.084 kg/m². The coated layer was cured at 160° C. for 10 minutes.

The thus-formed foraminous element was then placed into a conventional polyvinyl chloride plastisol composition containing 26.2% of a medium molecular weight vinyl chloride polymer, 31.4% mixed ester phthalate plasticizer, and 42% calcium carbonate filler, together with small amounts of stabilizers, colorants, and other additives. After mixing, the polyvinyl chloride plastisol mixture was uniformly coated with a doctor blade coater to a wet thickness of 1.1 mm over a width of 200 mm onto a releasable surface. The three-dimensional layer was then placed into the liquid plastisol. Nylon-6,6 bristle fibers which were 100 denier in fineness and 8 mm to 10 mm long were coated onto the upper horizontal surface of the foraminous element by means of an "Indev" 650 mm wide flock machine. The bristle fibers were placed in feed hoppers from which the fibers were fed with the aid of brushes onto and through screens having 6 mm diameter openings and permitted to fall onto the surface of the foraminous element. Beater bars turning at about 150 rpm contacted the backside of the releasable surface web causing the bristle fibers to become vertically orientated, penetrate the openings of the foraminous element, and become lodged in the liquid plastisol. About 0.55 kg/m$^2$ of bristles were retained in a nearly uniform distribution. After being subjected to cure conditions of 160° C. for 10 minutes, the plastisol backing was solidified and the bristles and foraminous element were bonded thereto.

The resulting mat material weighed about 3.15 kg/m$^2$ and was about 10 mm thick. The bristles protruded through the foraminous element and extended up to 5 mm beyond the upper surface of the layer. The mat material was cut and seamed into mats. The resultant mats were effective in removing soil and moisture from pedestrians' shoes.

EXAMPLE 2

A mat was made in the same manner as described in Example 1 with exception that 45 denier, 9.5 mm long nylon-6,6 bristles were employed to yield bristle coating weight of 0.29 kg/m$^2$. The resultant mat was effective in removal of soil and moisture from pedestrians' shoes.

EXAMPLE 3

A preformed 85 mm square piece of a plasticized polyvinyl chloride foraminous element having openings 5 mm square, 6.35 mm deep, and wall thickness between openings of 0.79 mm was laid into plastisol layer having a depth of aout 2 mm. Then 45 denier, 6.4 mm long nylon-6,6 bristles were applied to the surface of the foraminous element, and the structure was subjected to vibratory action by vigorously tapping the container holding the sample, thus causing the bristles to penetrate the openings of the foraminous element and become lodged in the plastisol layer. After being subjected to cure conditions of 160° C. for 10 minutes, the plastisol backing was solidified, and the bristles and foraminous element were bonded thereto. The resultant mat segment was effective in removal of soil and moisture from pedestrians' shoes.

EXAMPLE 4

A foraminous element was prepared similar to that prepared in Example 1 with exception that the die used had the following dimensions:

| | |
|---|---|
| Slot width (major) | 1.27 mm |
| Slot length (major) | 7.92 mm |
| Slot width (minor) | 0.91 mm |
| Slot length (minor) | 7.92 mm |
| Slot spacing | 7.37 mm |
| Number of major slots | 12 |
| Number of minor slots | 13 |

The resultant element, which was about 15 mm thick, was placed into a liquid plastisol backing material as in Example 1. Polyethylene terephthalate bristles which were 330 denier and 15 mm long were caused to penetrate the openings in the foraminous element and to become lodged in the liquid plastisol. After being subjected to cure conditions of 160° C. for 10 minute, the plastisol backing was solidified and the bristles and foraminous element were bonded thereto. The resultant mat contained 0.65 kg/m$^2$ bristles and had a thickness of about 17 mm. The mat was effective in removing soil and moisture from pedestrians' shoes.

EXAMPLE 5

A mat was made in the same manner as described in Example 1 with the exception that slasher flock comprising 192 filaments of polyethylene terephthalate bristles which were 6 denier and 12.2 mm long, was used instead of the 100 denier nylon bristles. After the liquid plastisol had been cured, the composite mat material was washed with water to remove the temporary binder from the slasher flock. The resultant mat material contained 0.55 kg/m$^2$ slasher flock. The mats prepared with slasher flock were water absorbent, removed soil from the shoes of pedestrians, and had a luxurious appearance.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A mat for removing soil and moisture from shoes and feet comprising:
   a. a water-resistant, wear-resistant backing,
   b. a water-resistant, wear-resistant foraminous element having a multiplicity of openings therein bonded to one surface of said backing, and
   c. a multiplicity of water-resistant, wear-resistant bristles having one end bonded to said backing, said bristles being capable of protruding through said openings in said foraminous element to contact shoes and feet when said foraminous element is trod upon by pedestrians.

2. The mat of claim 1 wherein drainage channels are formed in the foraminous element, whereby moisture can be removed from said element.

3. The mat of claim 1 wherein said foraminous element is formed from strips which are undulated and are connected on their major surfaces to other undulated strips.

4. The mat of claim 1 wherein said foraminous element is formed from strips which are undulated and are connected on their major surfaces to straight, elongated strips.

5. The mat of claim 4 wherein said straight strips are bonded to said backing and said undulated strips are separated from said backing so as to form drainage channels beneath said undulated strips, whereby moisture can be removed from said foraminous element.

6. The mat of claim 4 wherein said undulated strips are bonded to said backing and said straight strips are separated from said backing so as to form drainage channels beneath said straight strips, whereby moisture can be removed from said foraminous element.

7. The mat of claim 1 wherein said foraminous element is formed from a cast sheet having a multiplicity of openings extending through the entire thickness thereof.

8. The mat of claim 1 wherein the area of the upper surface of said foraminous element comprises at least about 40% openings and less than 60% solid material.

9. The mat of claim 1 wherein said bristles have a length equal to or greater than the thickness of the foraminous element.

10. The mat of claim 1 wherein said bristles have a length less than the thickness of the foraminous element.

11. The mat of claim 1 wherein said bristles are formed from slasher flock.

12. The mat of claim 1 wherein said backing is formed from an organic polymeric material.

13. The mat of claim 1 wherein said foraminous element is formed from an organic polymeric material.

14. The mat of claim 1 wherein said backing is formed of continuous material.

* * * * *